(12) United States Patent
Lim

(10) Patent No.: US 9,636,947 B2
(45) Date of Patent: May 2, 2017

(54) BICYCLE AXLE ASSEMBLY

(75) Inventor: Puat Thiam Lim, Jurong Town (SG)

(73) Assignee: Shimano (Singapore) PTE. LTD, Jurong Town (SG)

( * ) Notice: Subject to any disclaimer, the term of this patent is extended or adjusted under 35 U.S.C. 154(b) by 961 days.

(21) Appl. No.: 13/422,623

(22) Filed: Mar. 16, 2012

(65) Prior Publication Data

US 2013/0241271 A1 Sep. 19, 2013

(51) Int. Cl.
  *B60B 35/00* (2006.01)
  *B60B 27/02* (2006.01)
  *B62K 25/02* (2006.01)
  *B60B 27/00* (2006.01)

(52) U.S. Cl.
  CPC ............ *B60B 27/026* (2013.01); *B62K 25/02* (2013.01); *B60B 27/0005* (2013.01); *B60B 2900/113* (2013.01); *B60B 2900/531* (2013.01); *B60B 2900/541* (2013.01); *B62K 2206/00* (2013.01)

(58) Field of Classification Search
  CPC ......... B60B 27/00; B60B 35/00; B62K 21/02; B62K 2206/00; F16B 37/0864
  USPC ................ 301/110.5, 124.1, 124.2; 280/279; 411/432, 384, 389, 397, 916, 917
  See application file for complete search history.

(56) References Cited

U.S. PATENT DOCUMENTS

| 4,964,287 | A | * | 10/1990 | Gaul ............................... 70/233 |
| 5,447,362 | A | | 9/1995 | Nagano |
| 6,196,781 | B1 | * | 3/2001 | Yang .............................. 411/384 |
| 6,241,322 | B1 | | 6/2001 | Phillips |
| 6,669,306 | B1 | | 12/2003 | Hara et al. |
| 8,075,065 | B2 | * | 12/2011 | Mercat et al. ............. 301/124.2 |
| 2006/0181139 | A1 | * | 8/2006 | Nilsen et al. ............ 301/37.374 |
| 2009/0072613 | A1 | * | 3/2009 | Inoue et al. ................. 301/132 |
| 2012/0261979 | A1 | | 10/2012 | Ashman |
| 2013/0011213 | A1 | * | 1/2013 | Marks et al. ................. 411/274 |

FOREIGN PATENT DOCUMENTS

| DE | 297 14 945 U1 | 11/1997 |
| EP | 1 413 506 B1 | 2/2006 |
| WO | WO 99/19636 A1 | 4/1999 |
| WO | WO 01/57347 A1 | 8/2001 |

OTHER PUBLICATIONS

U.S. Appl. No. 13/309,564, filed Dec. 2, 2011, Lim.

* cited by examiner

*Primary Examiner* — S. Joseph Morano
*Assistant Examiner* — Jean Charleston
(74) *Attorney, Agent, or Firm* — Global IP Counselors, LLP

(57) ABSTRACT

A bicycle axle assembly has a nut, a main body member and an adjustment structure. The nut includes a bore having an internal thread. The main body member includes a nut bore. The nut is disposed in the nut bore. The adjustment structure adjustably couples the nut to move axially with respect to the main body member.

29 Claims, 13 Drawing Sheets

BICYCLE AXLE ASSEMBLY

BACKGROUND

Field of the Invention

This invention generally relates to a bicycle axle assembly. More specifically, the present invention relates to a bicycle axle assembly that is used for attaching a bicycle wheel to a bicycle frame.

Background Information

In the past various bicycle parts have been attached using nut and bolt arrangements. However, while certain bicycle parts are designed to be permanently attached to the bicycle, other bicycle parts such as bicycle wheels need to be loosened and removed relatively often. For example, bicycle wheels need to be removed from the frame whenever there is a flat tire. Moreover, bicycle wheels often need to be removed in order to transport a bicycle in an automobile.

Due to the need to remove and reinstall bicycle wheels, bicycle wheel hubs have been provided with quick release mechanisms in order to facilitate easier removal and reinstallation of the wheels. A typical quick release device includes a skewer or shaft with a threaded end having a quick release member mounted at the other end. The quick release member includes a base with a lever and a cam structure. A nut is detachably threaded onto the threaded end of the skewer after the skewer is inserted through the hub body. The fork flanges of the frame are arranged adjacent the base of the quick release member and the hub body and between the nut and the hub body, respectively. Thus, the hub can be attached to the frame by clamping the fork flanges using the quick release lever. These typical quick release mechanisms generally work well. However, with these typical quick release mechanisms, it is sometimes difficult to remove and reinstall a bicycle wheel with a single person.

SUMMARY

One aspect presented in this disclosure is to provide a bicycle axle assembly that permits a rider to easily remove and reinstall a bicycle wheel from a bicycle frame single-handedly without the need of help from another person to stabilize the bicycle.

Another aspect presented in this disclosure is to provide a bicycle axle assembly that makes wheel assembly easy.

Another aspect presented in this disclosure is to provide a bicycle axle assembly that does not require re-adjustment for subsequent wheel installation.

In view of the state of the known technology, a bicycle axle assembly comprises a nut, a main body member and an adjustment structure. The nut includes a bore having an internal thread. The main body member includes a nut bore. The nut is disposed in the nut bore. The adjustment structure adjustably couples the nut to move axially with respect to the main body member.

These and other objects, features, aspects and advantages of the bicycle axle assembly will become apparent to those skilled in the art from the following detailed description, which, taken in conjunction with the annexed drawings, discloses one exemplary embodiment.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
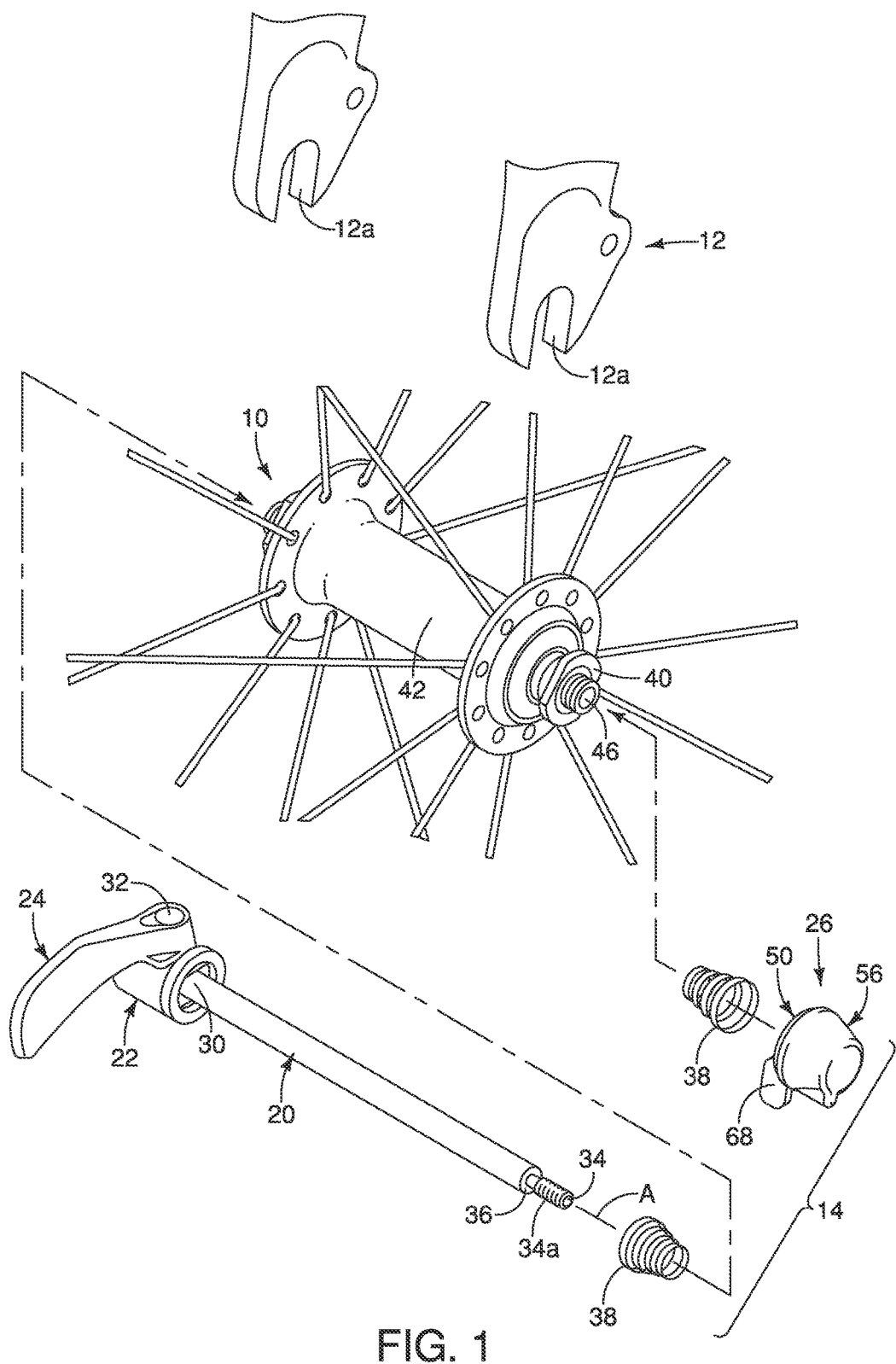
FIG. 1 is an exploded, perspective view of a portion of a bicycle front fork, a front bicycle hub and a bicycle axle assembly in accordance with a first exemplary embodiment.
Figure 2:
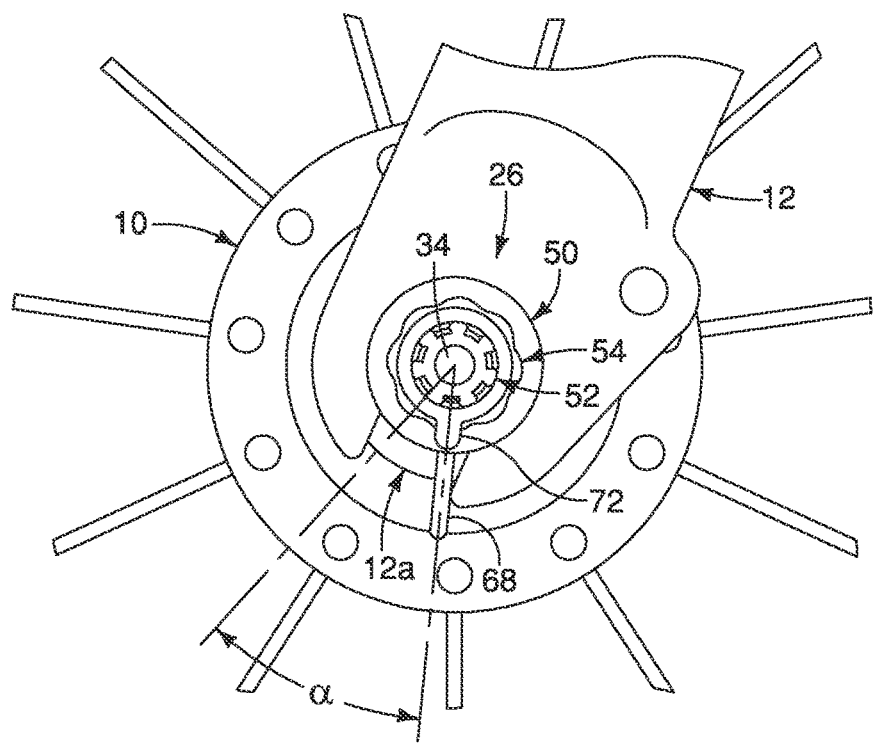
FIG. 2 is an enlarged elevational view of the portion of the front fork, the front bicycle hub and the bicycle axle assembly (the cover member removed) illustrated in FIG. 1, but in an assembled state.

Referring initially to FIGS. 1 and 2, a front bicycle hub 10 is mounted to a bicycle fork 12 using a bicycle axle assembly 14 in accordance with one embodiment. Of course, the bicycle axle assembly 14 is not limited to being used with a front hub. For example, the bicycle axle assembly 14 can be used with a rear hub to connect a rear wheel to the rear portion of the bicycle frame. The bicycle axle assembly 14 is a quick release mechanism for quickly and easily removing and reinstalling the front bicycle hub 10 to the bicycle fork 12. The bicycle axle assembly 14 is a bicycle component that basically includes a skewer or shaft member 20, a head member 22, a quick release cam lever member 24 and a nut member 26.

The shaft member 20 has a center longitudinal axis that also defines a center longitudinal axis A of the bicycle axle assembly 14. Except for the nut member 26, the bicycle axle assembly 14 is a conventional quick release axle that is commonly used with bicycle hubs. In other words, the nut member 26 can be used as a replacement nut for a conventional quick release axle. Thus, the shaft member 20, the head member 22 and the cam lever member 24 will only be briefly discussed herein.

Figure 6:
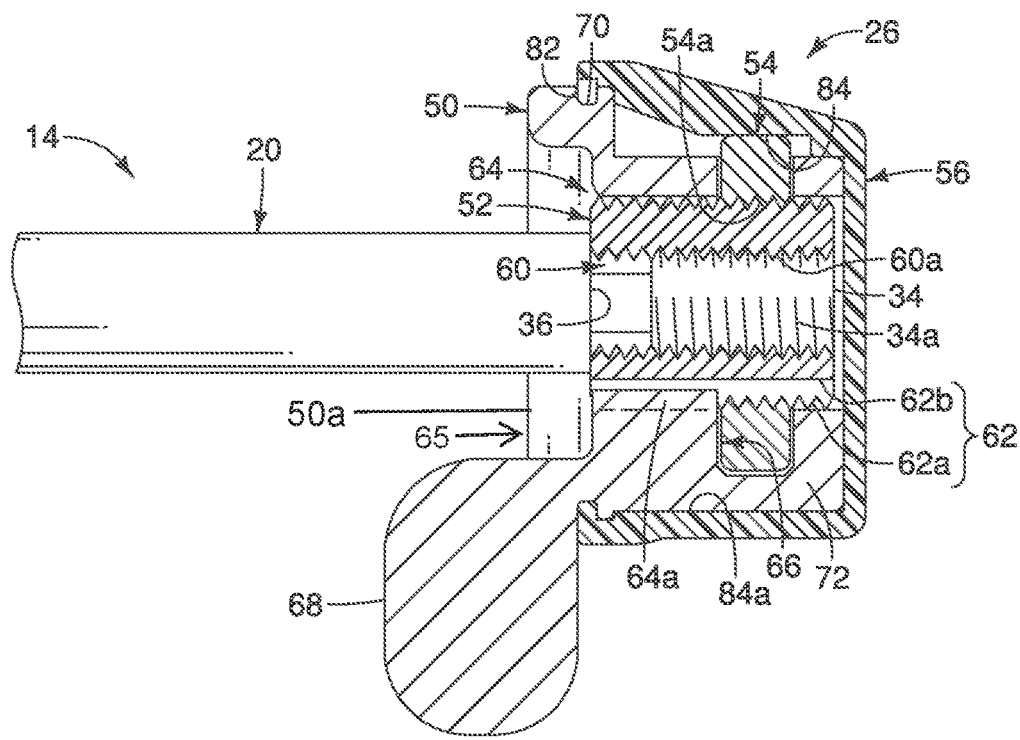
FIG. 6 is an enlarged cross-sectional view of the nut member of the bicycle axle assembly illustrated in FIGS. 1 to 5 with the nut being substantially fully screwed into the main body member.
Figure 7:
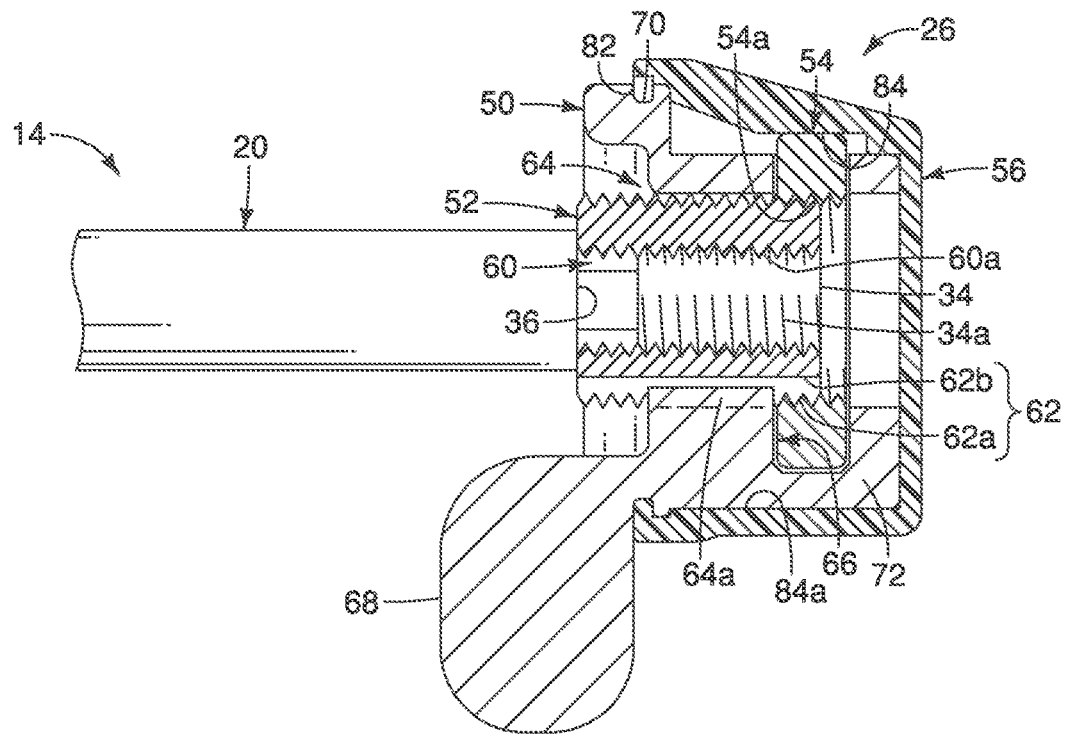
FIG. 7 is an enlarged cross-sectional view of the nut member of the bicycle axle assembly illustrated in FIGS. 1 to 5 with the nut being substantially mostly unscrewed from the main body member.
Figure 8:
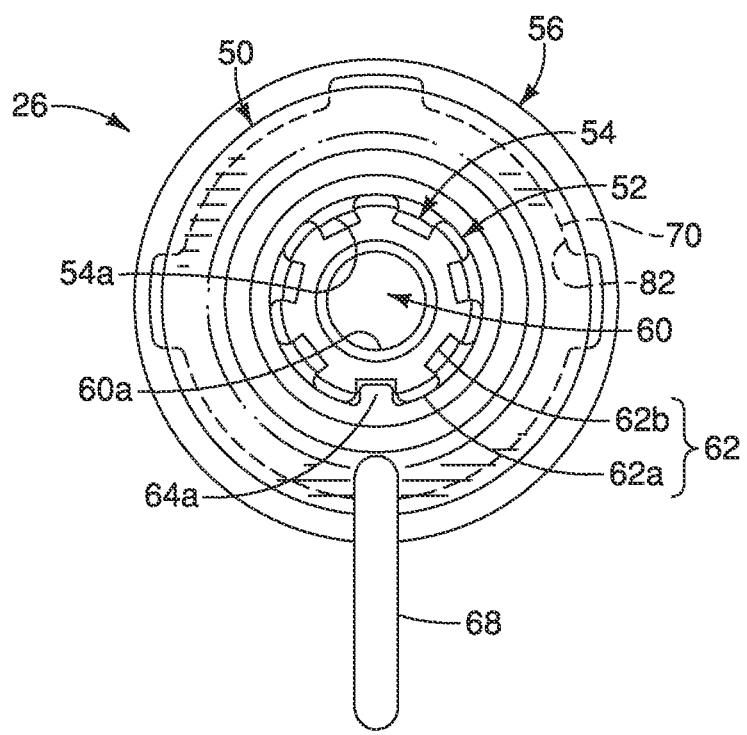
FIG. 8 is a frame facing end elevational view of the nut member illustrated in FIGS. 1 to 7.
Figure 9:
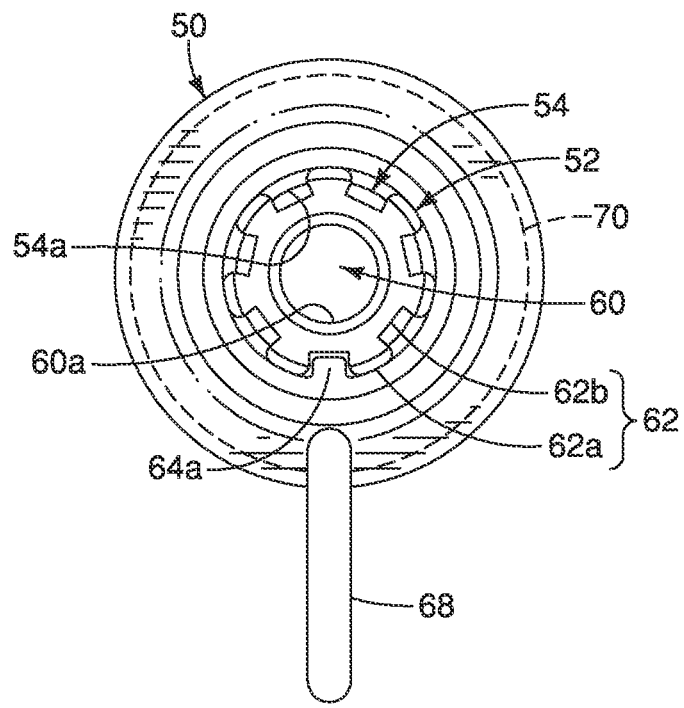
FIG. 9 is a frame facing end elevational view, similar to FIG. 8, of the nut member, but with the cover member removed.

The shaft member 20, the head member 22 and the cam lever member 24 are preferably constructed of lightweight rigid materials such as metallic materials that are commonly used for these parts. The head member 22 is movably disposed on a first end 30 of the shaft member 20 by a cam pin 32 of the cam lever member 24. Thus, the cam lever member 24 is operatively mounted between the shaft member 20 and the head member 22 via the cam pin 32 to axially move the shaft member 20 relative to the head member 22 in response to movement of the cam lever member 24. The shaft member 20 has a second end 34 with an external thread 34a. The nut member 26 is screwed onto the second end 34 of the shaft member 20. The shaft member 20 has a stopper 36 that is formed adjacent an axially inner end of the external thread 34a of the shaft member 20. As seen in FIGS. 6 and 7, the stopper 36 of the shaft member 20 contacts the nut member 26 to prevent the nut member 26 from being screwed further onto the shaft member 20. Thus, the nut member 26 has a fixed stopping point. However, as explained below, the nut member 26 includes an adjustment arrangement such that an effective lateral clamping dimension L (FIG. 5) between the head member 22 and the nut member 26 can be adjusted after the nut member 26 has been fully screwed onto the shaft member 20. The effective lateral clamping dimension L refers to the distance between the frame engagement surface of the head member 22 and the frame engagement surface of the nut member 26 with the cam lever member 24 in the closed position as seen in FIG. 5. Of course, when the cam lever member 24 is in the open position as seen in FIG. 4, the distance between the frame engagement surface of the head member 22 and the frame engagement surface of the nut member 26 becomes larger than the effective lateral clamping dimension L so that the wheel can be removed from the bicycle fork 12.

Figure 4:
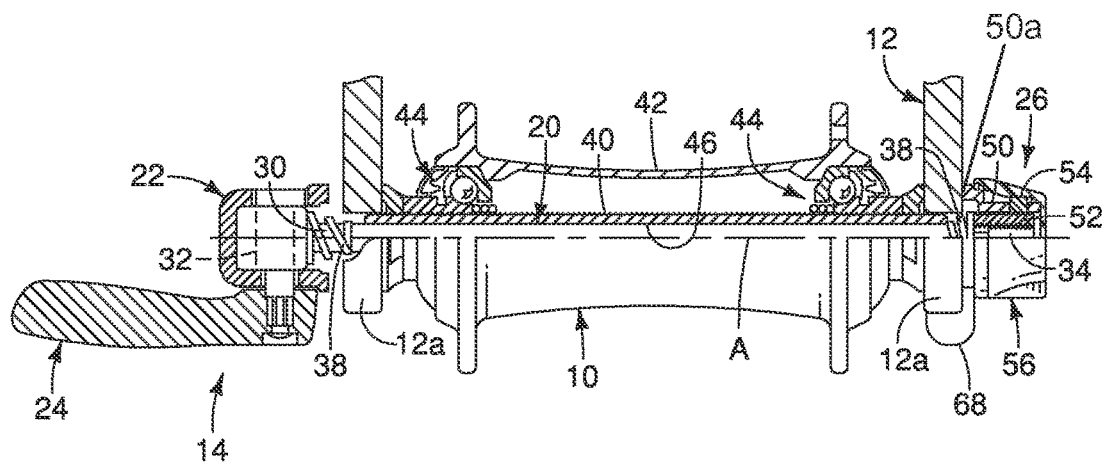
FIG. 4 is a fragmentary cross-sectional view of the portion of the bicycle front fork, the front bicycle hub and the bicycle axle assembly illustrated in FIGS. 1 to 3.
Figure 5:
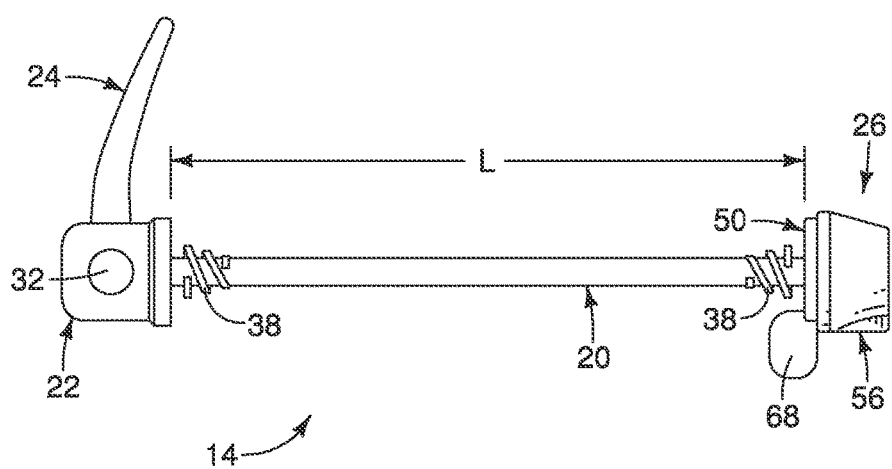
FIG. 5 is an elevational view of the bicycle axle assembly illustrated in FIGS. 1 to 4.

As seen in FIGS. 4 and 5, the bicycle axle assembly 14 typically also includes a pair of compression springs 38. The compression springs 38 are disposed on the shaft member 20. One of the compression springs 38 is mounted on the shaft member 20 between the head member 22 and a first end of the bicycle hub 10 for biasing the head member 22 away from the first end of the bicycle hub 10. The other one of the compression springs 38 is mounted on the shaft member 20 between the nut member 26 and a second end of the bicycle hub 10 for biasing the nut member 26 away from the second end of the bicycle hub 10.

Figure 3:
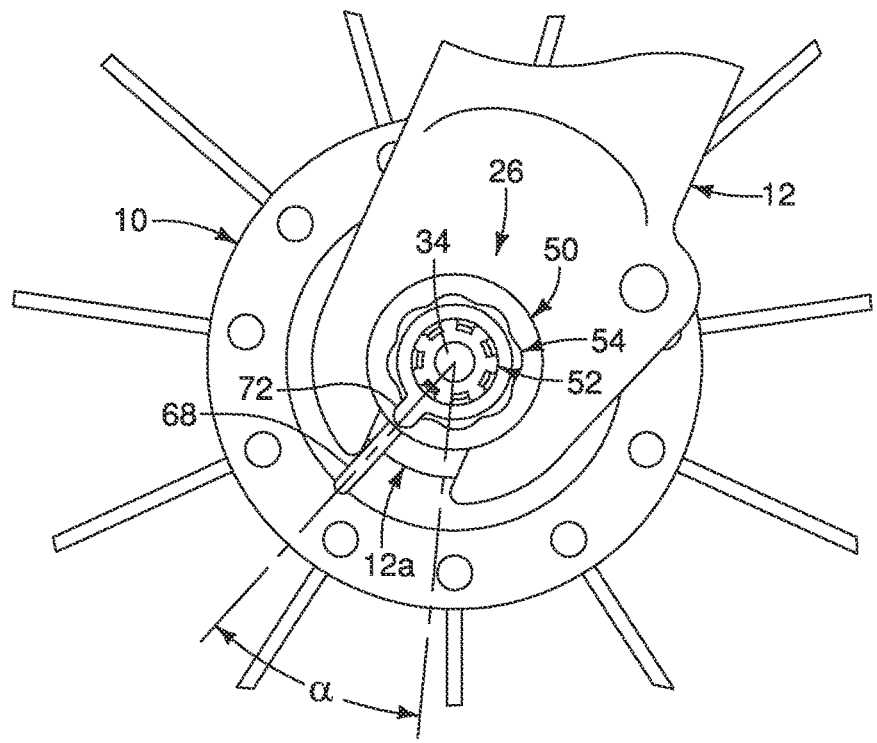
FIG. 3 is an enlarged elevational view of the portion of the front fork, the front bicycle hub and the bicycle axle assembly (the cover member removed) illustrated in FIGS. 1 and 2, but with the bicycle axle assembly rotated clockwise from the position illustrated in FIG. 2.

The bicycle hub 10 will now be briefly discussed relative to FIGS. 1 to 3. The bicycle hub 10 basically includes a hollow spindle or shaft 40 and a hub shell 42 rotatably supported on the spindle 40. Typically, the hub shell 42 is rotatably supported on the spindle 40 by a pair of bearing units 44. The spindle 40 has an internal bore 46 for receiving the shaft member 20 therein. The ends of the spindle 40 are received in the drop-outs 12a of the front fork 12. Since the bicycle axle assembly 14 can be used with any type of hub that has a hollow spindle, the bicycle hub 10 will not be discussed in further detail.

Turning now to FIGS. 6 to 13, the nut member 26 will now be discussed in more detail. The nut member 26 basically includes a main body member 50, a nut 52 and an adjustment member 54. Preferably, the nut member 26 also includes a cover member 56. However, as discussed below, the adjustment member 54 and the cover member 56 can be elimination by integrating the main body member 50 and the adjustment member 54 together as a single one-piece member. In the illustrated embodiment, the main body member 50, the nut 52 and the adjustment member 54 are each formed of a hard rigid material such as a metallic material. On the other hand, the cover member 56 is formed of a more resilient material such as a plastic resin material. By using a plastic resin or other suitable material, the cover member 56 can be snap fitted onto the main body member 50 and frictionally engaged with the adjustment member 54 with an interference fit to prevent the adjustment member 54 from turning.

Basically, as illustrated in FIGS. 6 and 7, the nut 52 is axially movable relative to the main body member 50 by the adjustment member 54, and the cover member 56 overlies the adjustment member 54 to cover and restrict movement of the adjustment member 54. The nut member 26 is attached to the second end 34 of the shaft member 20 by screwing the nut 52 onto the external thread 34a of the second end 34 of the shaft member 20. More specifically, the nut 52 includes a bore 60 having an internal thread 60a that is threadedly engaged with the external thread 34a of the shaft member 20 to attach the nut member 26 to the second end 34 of the shaft member 20. As seen in FIGS. 6 and 7, the stopper 36 of the shaft member 20 contacts the nut 52 to prevent the external thread 34a of the shaft member 20 from being screwed farther into the nut 52. Thus, the nut 52 has a fixed stopping point with respect to the shaft member 20 such that the lateral distance between the head member 22 and the nut 52 is set to a predetermined dimension with the nut 52 being fully screwed onto the shaft member 20.

Figure 10:
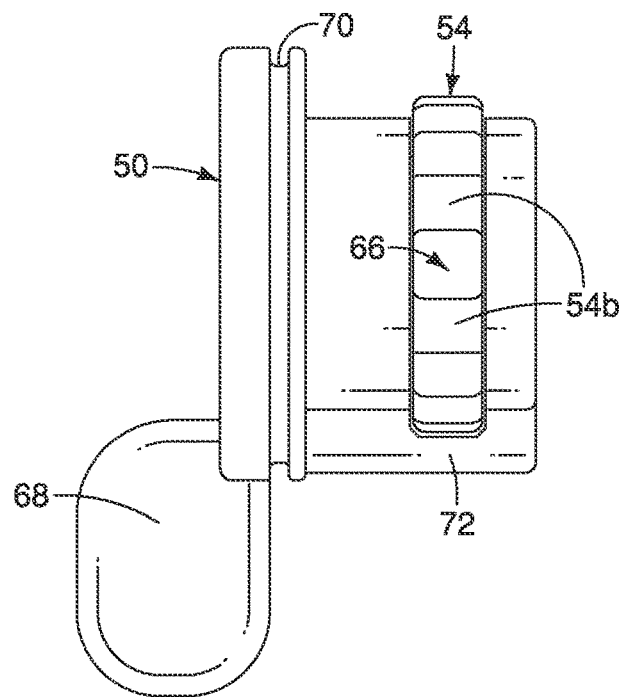
FIG. 10 is a side elevational view of the parts of the nut member illustrated in FIG. 9 in which the cover member has been removed from the nut member.
Figure 11:
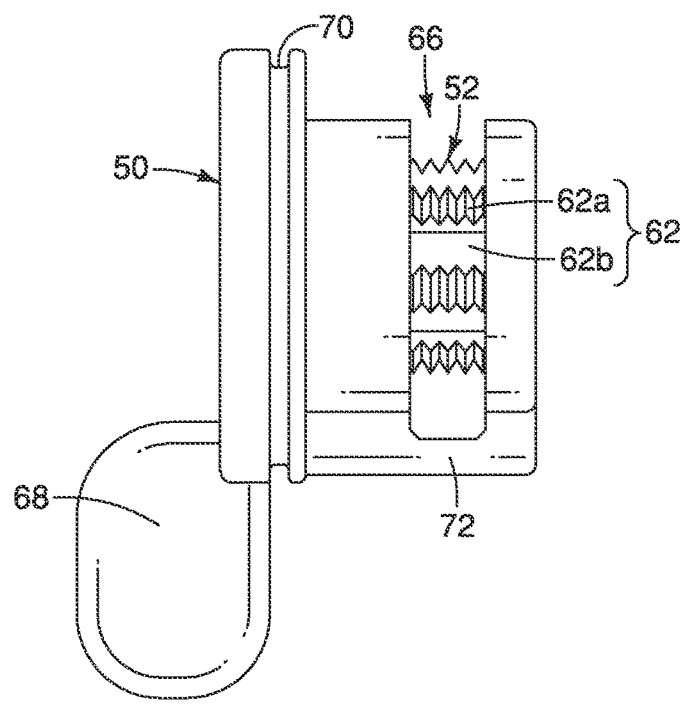
FIG. 11 is a side elevational view, similar to FIG. 10, of the parts of the nut member illustrated in FIG. 9 but with the adjustment member also removed.

The nut 52 further includes an external surface 62 having an external thread 62a and a first anti-rotational structure 62b, which is formed by a plurality of straight axially extending grooves or slots. The main body member 50 includes an abutment surface 50a that is configured to abut a bicycle body, such as the bicycle fork 12. The main body member 50 further includes a nut bore 64 that is unthreaded. The nut bore 64 has a receiving end 63 that is configured to receive the nut 52. The nut 52 is movably disposed in the nut bore 64 at the receiving end 63 for axial movement by rotating the adjustment member 54. Specifically, the adjustment member 54 is rotatably disposed in a slot 66 of the main body member 50. The abutment surface 50a is located at the receiving end of the nut bore 64. The slot 66 is dimensioned to restrict axial movement of the adjustment member 54 relative to the main body member 50 (FIGS. 6, 7 and 10). The adjustment member 54 has an internal thread 54a and a plurality of depressions 54b. The depressions 54b creates a non-circle gripping surface for better gripping the adjustment member 54 to turn the adjustment member 54 relative to the main body member 50 and the nut 52. The internal thread 54a is threadedly engaged with the external thread 62a of the nut 52. In this way, rotation of the adjustment member 54 relative to the main body member 50 moves the nut 52 axially with respect to the main body member 50. Thus, in this first embodiment, the external thread 62a of the nut 52 and the internal thread 54a of the adjustment member 54 constitute an adjustment structure that adjustably couples the nut 52 to the main body member 50 for axial movement of the nut 52 with respect to the main body member 50.

The main body member 50 includes a locking projection 68, which that is arranged to engage a dropout 12a of the bicycle fork 12 (i.e., the bicycle frame) while the bicycle axle assembly 14 is in an installed position as seen in FIGS. 2 to 4. As seen in FIGS. 2 and 3, however in this first embodiment, the locking projection 68 is dimensioned relative to the width of the dropout 12a to provide a limited amount of rotational adjustment of the bicycle axle assembly 14 relative to the front fork 12 while the bicycle axle assembly 14 is in an installed position. For example, the locking projection 68 can be dimensioned relative to the width of the dropout 12a to provide an adjustment angle α of forty degrees in the illustrated embodiment.

The main body member 50 further includes a second anti-rotational structure 64a, which is formed by a straight axially extending rib. The second anti-rotational structure 64a (e.g. the rib) is engaged with the first anti-rotational structure 62b (e.g. one of the grooves or slots) to restrict relative rotation between the nut 52 and the main body member 50. By using a plurality of grooves as the first anti-rotational structure 62b, the user can adjust an angular portion of the nut 52 with respect to the main body member 50. In this way, the angular position of the cam lever member 24 can be positioned at the desired orientation with respect to the locking projection 68 to attain the desired orientation of the cam lever member 24 with respect to the bicycle fork 12 (i.e., the bicycle frame).

The main body member 50 further includes an axial retention structure 70 and a restricting part 72. The axial retention structure 70 engages the cover member 56 for releasably retaining the cover member 56 over the main body member 50 while the cover member 56 is disposed on the main body member 50 in the engaged position. In the first embodiment, the axial retention structure 70 is formed by an annular groove. The restricting part 72 engages the cover member 56 for preventing the cover member 56 from rotating with respect to the main body member 50 while the cover member 56 is disposed on the main body member 50 in the engaged position. In the first embodiment, the restricting part 72 is formed by a straight axially extending rib.

Figure 12:
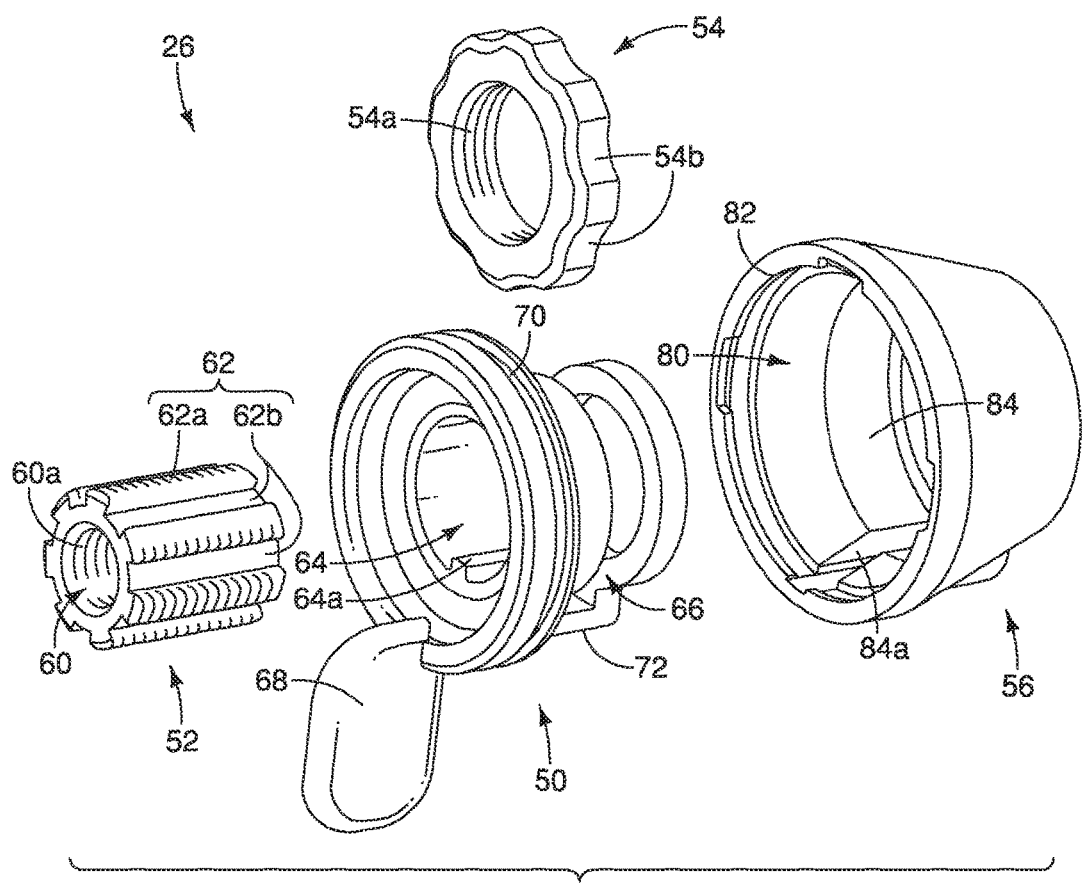
FIG. 12 is an exploded perspective view of the nut member in accordance with the first embodiment.
Figure 13:
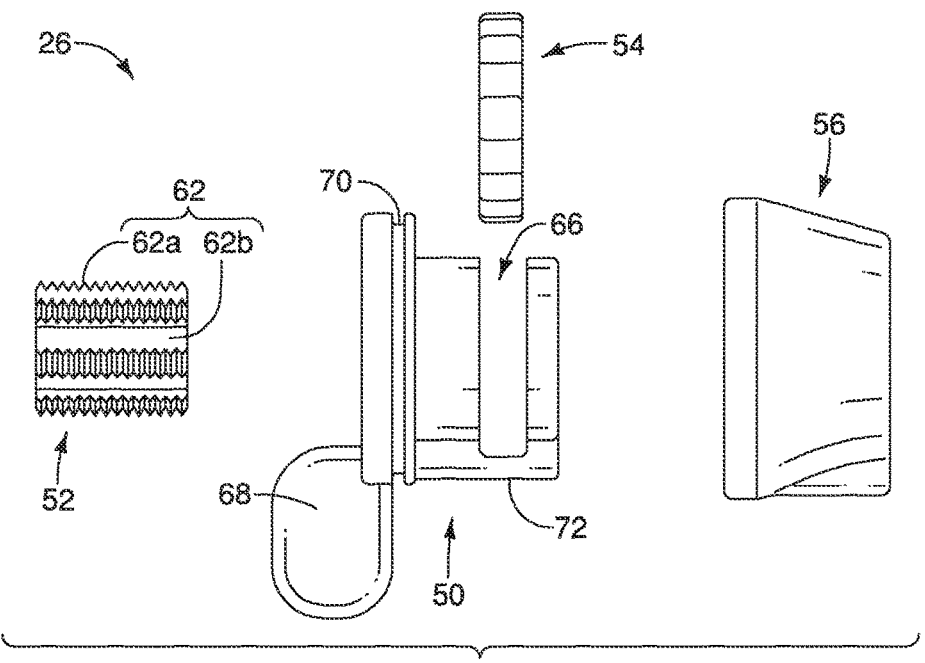
FIG. 13 is an exploded side elevational view of the nut member illustrated in FIG. 12 in accordance with the first embodiment.

As seen in FIGS. 6, 7 and 12, the cover member 56 is a cap that has a cavity 80 that is dimensioned to receive the main body member 50, the nut 52 and the adjustment member 54. In the engaged position, the cover member 56 is disposed on the main body member 50 such that the locking projection 68 projects out of the cover member 56, while the adjustment member 54 is completely concealed by the cover member 56. In other words, the cover member 56 is configured to prevent the adjustment member 54 from being exposed while the cover member 56 is disposed on the main body member 50 in the engaged position. The cover member 56 also keeps the adjustment structure clean and free from dirt and mud.

Preferably, the cover member 56 includes an axial retention structure 82 that temporarily holds the main body member 50. In this first embodiment, the axial retention structure 82 is formed by three arc-shaped tabs or protrusions. The axial retention structure 82 (i.e., the arc-shaped tabs) mates with the axial retention structure 70 (i.e., the annular groove) of the main body member 50 for releasably securing the cover member 56 to the main body member 50 by a snap fit connection. In other words, the axial retention structure 82 (i.e., the arc-shaped tabs) on the cover member 56 snaps into the axial retention structure 70 (i.e., the annular groove) of the main body member 50 to holds the cover member 56 tightly to the main body member 50.

Preferably, the cover member 56 includes a restricting part 84 that is non-rotatably disposed on the main body member 50 with the cover member 56 in the engaged position. In particular, the restricting part 84 is formed by the interior surface of the cover member 56 that at least partially defines an inner diameter of the cavity 80. The restricting part 84 includes a cutout 84a that receives the restricting part 72 of the main body member 50. Thus, relative rotation between the main body member 50 and the cover member 56 restricted by the restricting part 72 of the main body member 50 mating with the restricting part 84 of the cover member 56. Moreover, the restricting part 84 is configured to restrict axial movement of the nut 52 respect to the main body member 50 while the cover member 56, which includes the restricting part 84, is disposed on the main body member 50 in the engaged position. In particular, the restricting part 84 of the cover member 56 frictionally engages the adjustment member 54 to prevent the adjustment member 54 from turning respect to the main body member 50, and thus, prevents axial movement of the nut 52 respect to the main body member 50. In other words, the inner diameter of the restricting part 84 of the cover member 56 is dimensioned such that there is slight interference with the outer diameter of the adjustment member 54 to restrict the adjustment member 54 from rotation once the cover member 56 snaps onto the main body member 50.

Now, an initial setting of the bicycle axle assembly 14 with respect to the bicycle fork 12 (i.e., the bicycle frame) will be discussed. First, the shaft member 20 with the head member 22 attached thereto is inserted into the internal bore 46 of the spindle 40 and the nut 52 is screwed onto the second end 34 of the shaft member 20. Of course, the shaft member 20 could be inserted through the spindle 40 and the nut 52 is screwed onto the shaft member 20 after installing the hub 10 into the dropouts 12a of the bicycle fork 12. In any case, the nut 52 is screwed onto the external thread 34a of the shaft member 20. The nut 52 can be screwed onto the external thread 34a of the shaft member 20 with or without the main body member 50, the adjustment member 54 and the cover member 56 as needed and/or desired. The attachment of the nut 52 to the shaft member 20 can be accomplished by holding the nut 52 with one hand and turning the cam lever member 24 in the clockwise with the other hand to tighten the cam lever member 24 with respect to the nut member 26. Continue tightening the cam lever member 24 with respect to the nut member 26 until the shaft member 20 cannot be turned. Thus, the nut 52 is screwed onto the external thread 34a of the shaft member 20 until the nut 52 abuts against the stopper 36 of the shaft member 20, which prevents the nut 52 from being screwed farther unto the external thread 34a of the shaft member 20. In this way, the nut 52 has a fixed stopping point with respect to the shaft member 20.

If the nut member 26 is fully assembly, then complete removal of the cover member 56, the main body member 50 and the adjustment member 54 is necessary. Now, the front bicycle hub 10 is mounted to the bicycle fork 12 with the ends of the spindle 40 located in the drop-outs 12a of the front fork 12. Next, the cam lever member 24 is turned to a recommended orientation with respect to the bicycle frame. Then the main body member 50 and the adjustment member 54 are reassembled onto the nut 52. During this reassembly process, the main body member 50 is installed onto the nut 52 such that the second anti-rotational structure 64a (e.g. the rib) engages the first anti-rotational structure 62b (e.g. one of the grooves or slots) to prevent rotation of the main body member 50 on the nut 52. The first and second anti-rotational structures 62b and 64a are engaged such that the locking projection 68 projects into one of the dropouts 12a of the bicycle fork 12. In this way, the recommended orientation of the cam lever member 24 will be maintained each and every time the wheel is reinstalled on the bicycle fork 12.

In this position, the main body member 50 should be installed on the nut 52 (e.g., as shown in FIG. 7) such that the bicycle axle assembly 14 as a unit should be loose with respect to the bicycle fork 12 even when the cam lever member 24 is flipped to the "close" position. Now, the cam lever member 24 is moved to the open or release position and the adjustment member 54 rotated in a clockwise direction to tighten the bicycle axle assembly 14. The adjustment member 54 is continued to be rotated in a clockwise direction until resistance occurs in the rotation of the cam lever member 24 while the cam lever member 24 is parallel to the bicycle hub 10 (i.e., the cam lever member 24 is in the open or release position). Once resistance occurs in the rotation of the adjustment member 54, stop rotating the adjustment member 54. Next, the cam lever member 24 can now be moved to the locking ("close") position. This is accomplished by gripping the fork end of the front fork 12 with your fingers and using the palm of your hand to close the cam lever member 24 with as much strength as possible. With the bicycle axle assembly 14 locked onto the fork ends of the front fork 12, the cover member 56 is then snapped back onto the main body member 50 to complete the assembly. The cover member 56 now will hold the adjustment member 54 from turning.

Now, subsequent wheel removal can be easily accomplished with the wheel having the same axle retaining force that was provided prior to removal of the wheel from the bicycle frame. With one hand holding the bicycle, open the cam lever member 24 with the other hand and rotate the cam lever member 24 in the counterclockwise direction to loosen the bicycle axle assembly 14 with respect to the bicycle fork 12. Remove the wheel and proceed with the intended service.

Subsequent wheel installation of the same wheel, without changes made to bicycle axle assembly 14 can now be accomplished as follows. With one hand holding the bicycle, set the wheel on the fork end and ensure that the locking projection 68 of the nut member 26 sits in the dropout 12a of the fork ends of the bicycle fork 12. Turn the cam lever member 24 until the rotation is stopped due to the stopper 36 abutting against the nut 52. There is no need to count the number of turns of the cam lever member 24 during disassembly or assembly with the bicycle axle assembly 14 disclosed herein. The cam lever member 24 will return the same orientation as before with respect to the locking projection 68 of the nut member 26. The orientation of the cam lever member 24 with respect to the dropout 12a of the fork ends of the bicycle fork 12 can be adjusted by the adjustment angle α due to the dimensional difference between the dropout 12a and the locking projection 68. Now close the cam lever member 24 to secure the front bicycle hub 10 and the wheel to the bicycle fork 12.

Figure 14:
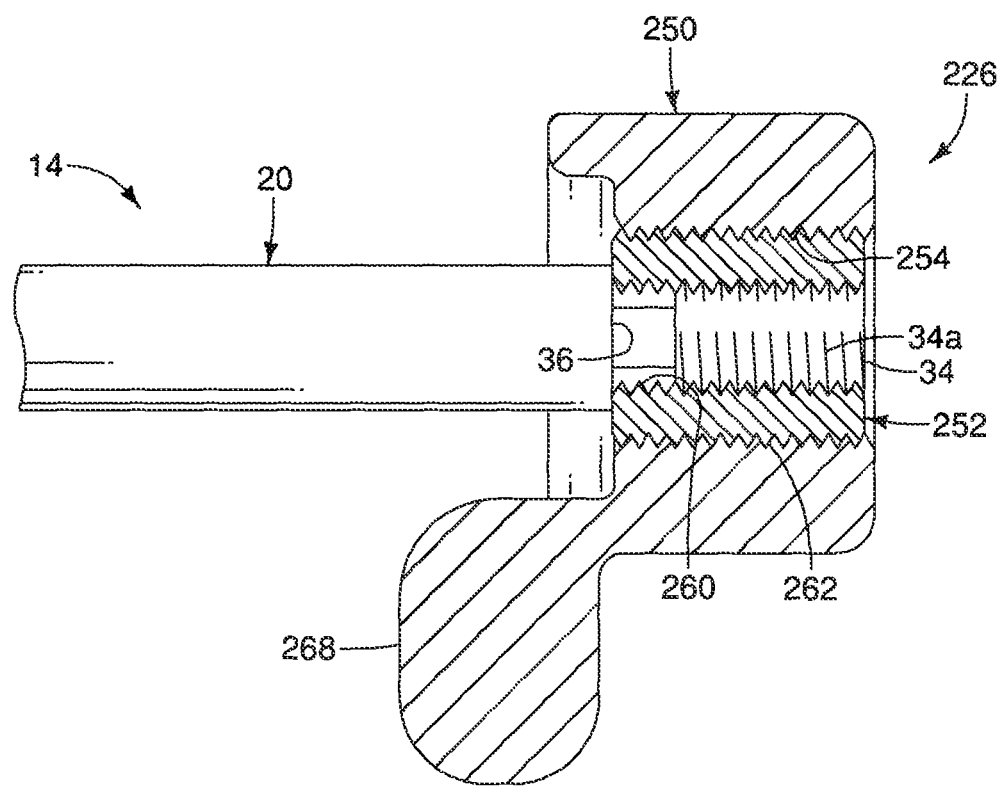
FIG. 14 is an enlarged cross-sectional view of a nut member in accordance with a second embodiment.
Figure 15:
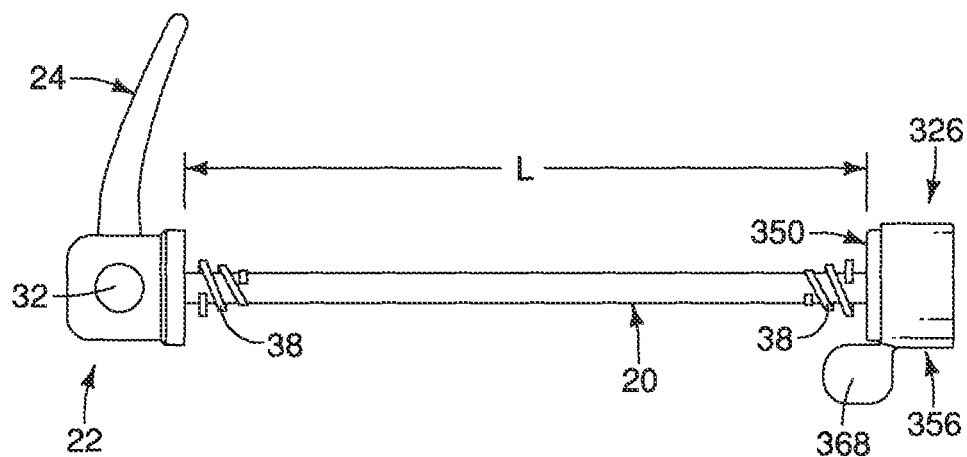
FIG. 15 is an elevational view of a bicycle axle assembly illustrated in accordance with a third embodiment.

Referring now to FIG. 14, a nut member 226 is illustrated in accordance with another exemplary embodiment. Here, the nut member 226 only includes a main body member 250 and a nut 252. In other words, in this second embodiment of FIG. 14, the adjustment member 54 and the cover member 56 from the first embodiment have been eliminated by using the main body member 250, which basically integrates the main body member 50 and the adjustment member 52 together as a single one-piece member. The nut member 226 is designed to replace the nut member 26 in the bicycle axle assembly 14, and thus, the nut member 226 is screwed onto the second end 34 of the shaft member 20 in the same manner as the nut member 26 as discussed above.

Basically, the nut member 226 operates in the same way as the nut member 26. In particular, the main body member 250 has an internally threaded nut bore 254, while the nut 252 has an internal thread 260 and an external thread 262. The internally threaded nut bore 254 of the main body member 250 is screwed onto the external thread 262 of the nut 252 such that the main body member 250 and the nut 252 can be adjusted axially relative to each other. Thus, in this second embodiment, the adjustment structure includes the external thread 262 formed on the nut 252 and the internal thread 254 formed on the internally threaded nut bore 254 of the main body member 250. The main body member 250 also has a locking projection 268 for engaging the dropout 12a.

Referring now to FIGS. 15 to 23, a nut member 326 is illustrated in accordance with another exemplary embodiment. Here, the nut member 326 includes a main body member 350, a nut 352, an adjustment member 354 and a cover member 356. The nut member 326 is designed to replace the nut member 26 in the bicycle axle assembly 14, and thus the nut member 326 is screwed onto the second end 34 of the shaft member 20.

In the illustrated embodiment, the main body member 350, the nut 352 and the adjustment member 354 are each formed of a hard rigid material such as a metallic material. On the other hand, the cover member 356 is formed of a more resilient material such as a plastic resin material. By using a plastic resin or other suitable material, the cover member 356 can be frictionally engaged with the main body member 350 and the adjustment member 354 with an interference fit connection to prevent the adjustment member 354 from turning.

Figure 16:
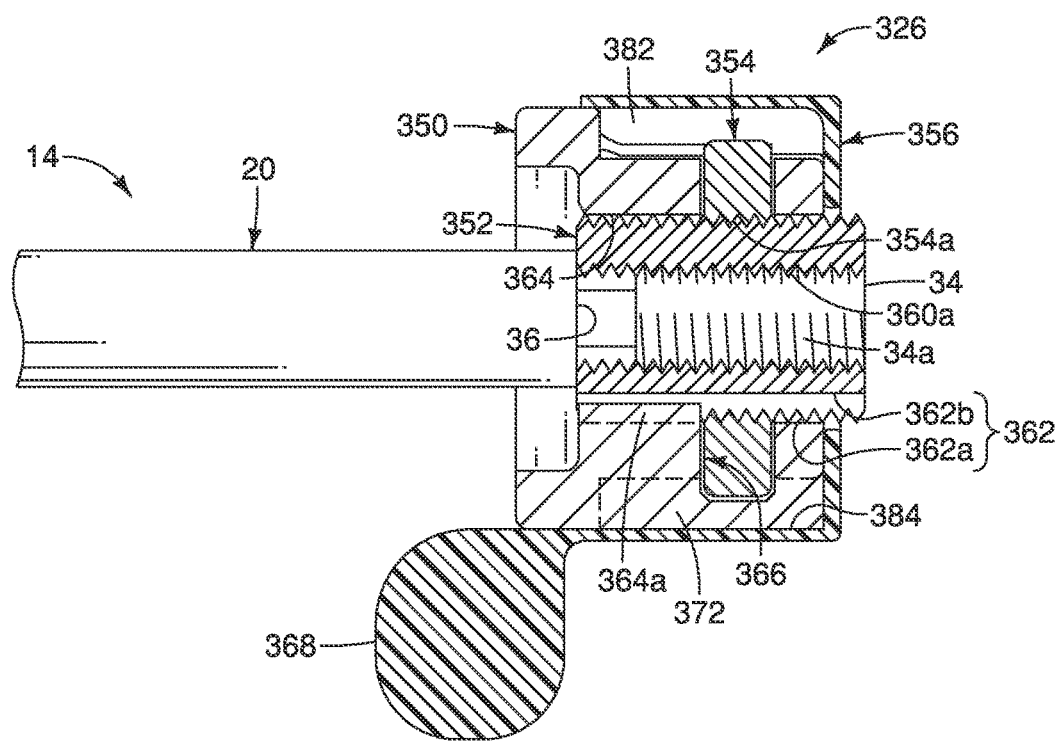
FIG. 16 is an enlarged cross-sectional view of the nut member of the bicycle axle assembly illustrated in FIG. 15 with the nut being substantially fully screwed into the main body member.
Figure 17:
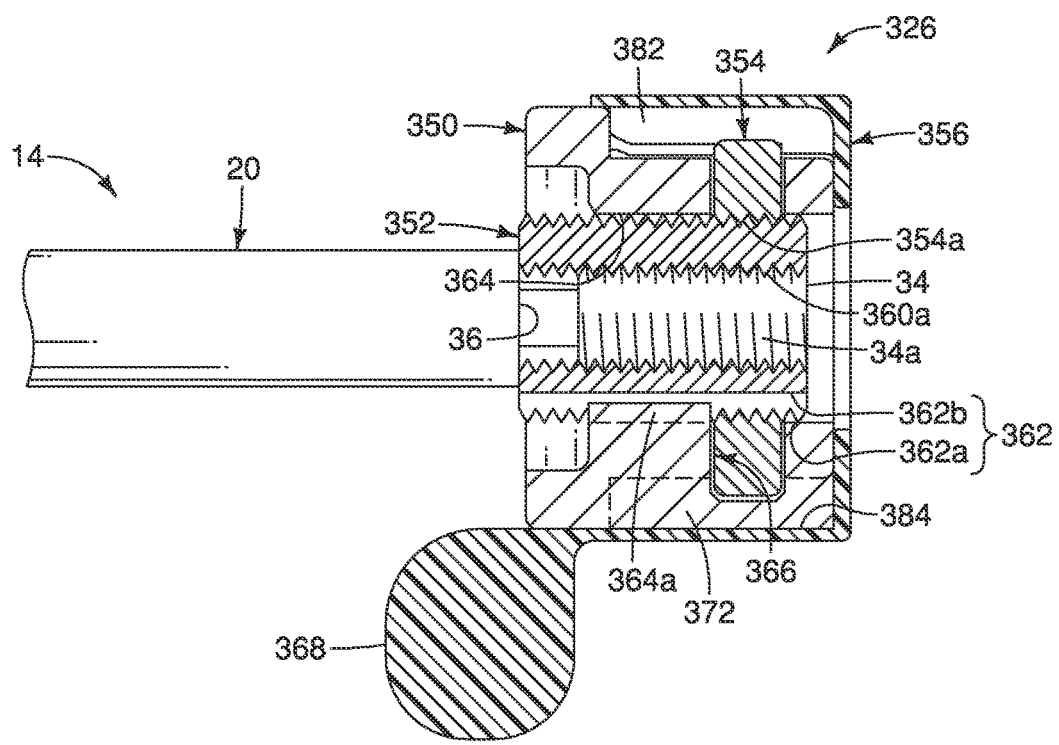
FIG. 17 is an enlarged cross-sectional view of the nut member of the bicycle axle assembly illustrated in FIG. 15 with the nut being substantially mostly unscrewed from the main body member.
Figure 18:
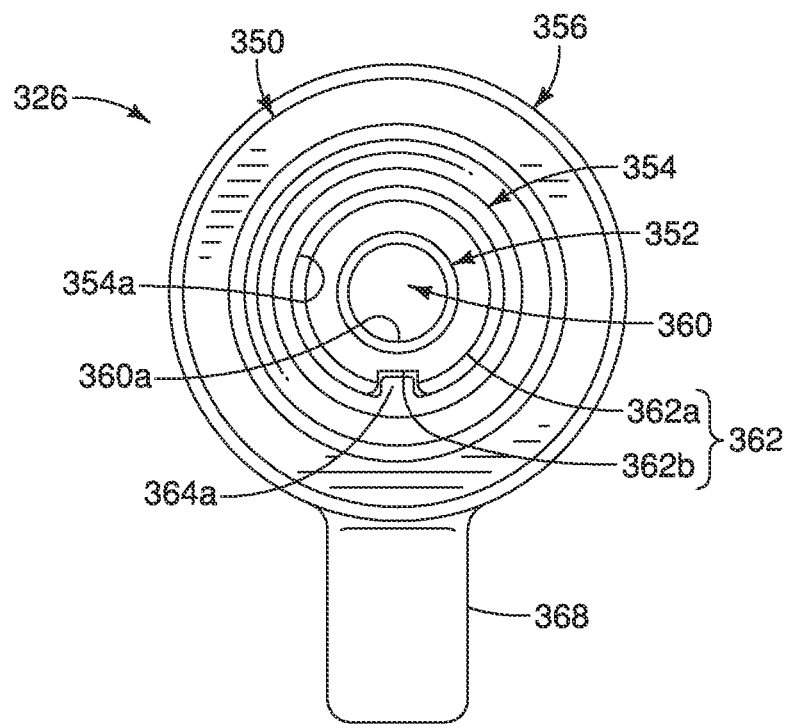
FIG. 18 is a frame facing end elevational view of the nut member illustrated in FIGS. 15 to 17.
Figure 19:
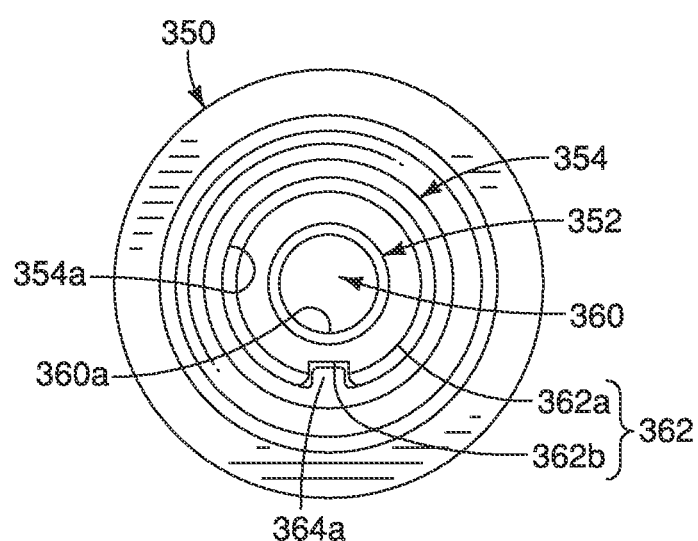
FIG. 19 is a frame facing end elevational view, similar to FIG. 18, of the nut member, but with the cover member removed.

Basically, as illustrated in FIGS. 16 and 17, the nut 352 is axially movable relative to the main body member 350 by the adjustment member 354, and the cover member 356 overlies the adjustment member 354 to cover and restrict movement of the adjustment member 354. The nut member 326 is attached to the second end 34 of the shaft member 20 by screwing the nut 352 onto the external thread 34a of the second end 34 of the shaft member 20. More specifically, the nut 352 includes a bore 360 having an internal thread 360a that is threadedly engaged with the external thread 34a of the shaft member 20 to attach the nut member 326 to the second end 34 of the shaft member 20. As seen in FIGS. 16 and 17, the stopper 36 of the shaft member 20 contacts the nut 352 to prevent the external thread 34a of the shaft member 20 from being screwed farther into the nut 352. Thus, the nut 352 has a fixed stopping point with respect to the shaft member 20 such that the lateral distance between the head member 22 and the nut 352 is set to a predetermined dimension with the nut 352 being fully screwed onto the shaft member 20.

Figure 20:
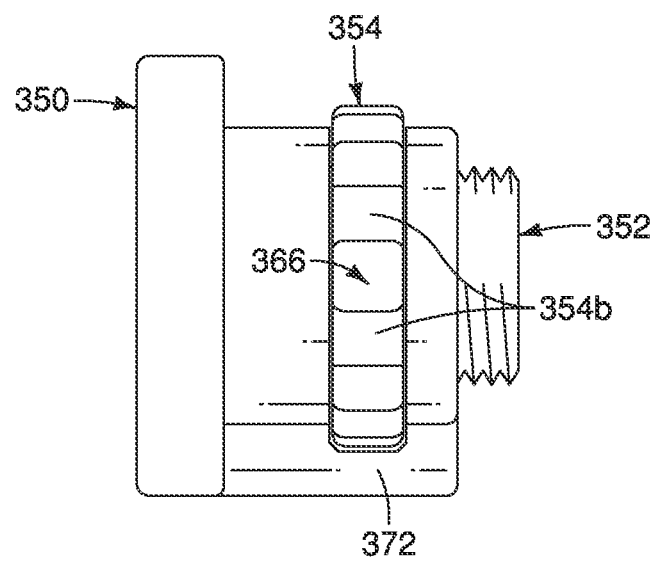
FIG. 20 is a side elevational view of the parts of the nut member illustrated in FIG. 19 in which the cover member has been removed from the nut member.
Figure 21:
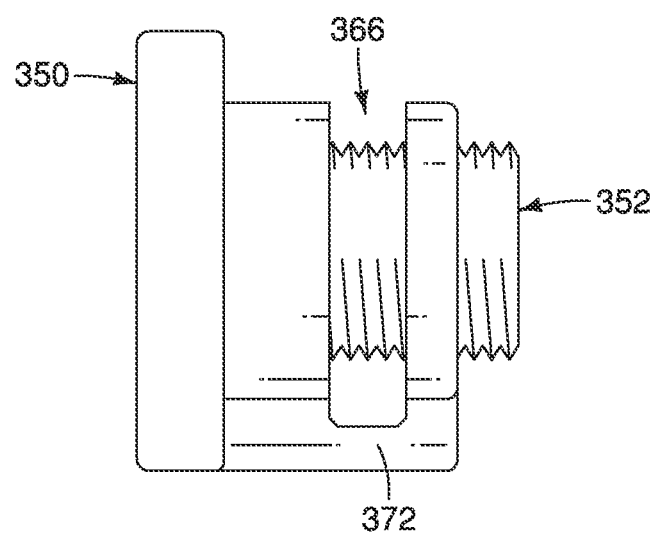
FIG. 21 is a side elevational view, similar to FIG. 20, of the parts of the nut member illustrated in FIG. 19 but with the adjustment member also removed.

The nut 352 further includes an external surface 362 having an external thread 362a and a first anti-rotational structure 362b, which is formed by a single straight axially extending groove or slot. The main body member 350 includes a nut bore 364 that is unthreaded. The nut 352 is movably disposed in the nut bore 364 for axial movement by rotating the adjustment member 354. Specifically, the adjustment member 354 is rotatably disposed in a slot 366 of the main body member 350. The slot 366 is dimensioned to restrict axial movement of the adjustment member 354 relative to the main body member 350 (FIGS. 16, 17 and 20). The adjustment member 354 has an internal thread 354a and a plurality of depressions 354b. The depressions 354b creates a non-circle gripping surface for better gripping the adjustment member 354 to turn the adjustment member 354 relative to the main body member 350 and the nut 352. The internal thread 354a is threadedly engaged with the external thread 362a of the nut 352. In this way, rotation of the adjustment member 354 relative to the main body member 350 moves the nut 352 axially with respect to the main body member 350. Thus, in this third embodiment, the external thread 362a of the nut 352 and the internal thread 354a of the adjustment member 354 constitute an adjustment structure that adjustably couples the nut 352 to the main body member 350 for axial movement of the nut 352 with respect to the main body member 350.

Here, the cover member 356 includes a locking projection 368, which that is arranged to engage a dropout 12a of the bicycle fork 12 (i.e., the bicycle frame) while the bicycle axle assembly 14 is in an installed position. However in this third embodiment, the locking projection 368 is dimensioned relative to the width of the dropout 12a to prevent rotational adjustment of the bicycle axle assembly 14 relative to the front fork 12 while the bicycle axle assembly 14 is in an installed position.

The main body member 350 further includes a second anti-rotational structure 364a, which is formed by a straight axially extending rib. The second anti-rotational structure 364a (e.g, the rib) is engaged with the first anti-rotational structure 362b (e.g. the groove or slot) to restrict relative rotation between the nut 352 and the main body member 350. Since a single groove is used as the first anti-rotational structure 362b and the locking projection 368 is provided on the cover member 356, the angular position of the cover member 356 with respect to the main body member 350 can be adjusted as explained. In this way, an angular position of the cam lever member 24 with respect to the locking projection 368 can be adjusted to attain the desired orientation of the cam lever member 24 with respect to the bicycle fork 12 (i.e., the bicycle frame).

The main body member 350 further includes a restricting part 372. The restricting part 372 engages the cover member 356 for preventing the cover member 356 from rotating with respect to the main body member 350 while the cover member 356 is disposed on the main body member 350 in the engaged position. In the third embodiment, the restricting part 372 is formed by a straight axially extending rib. The restricting part 372 also constitutes a first part of an angular adjustment structure between the main body member 350 and the cover member 356.

Figure 22:
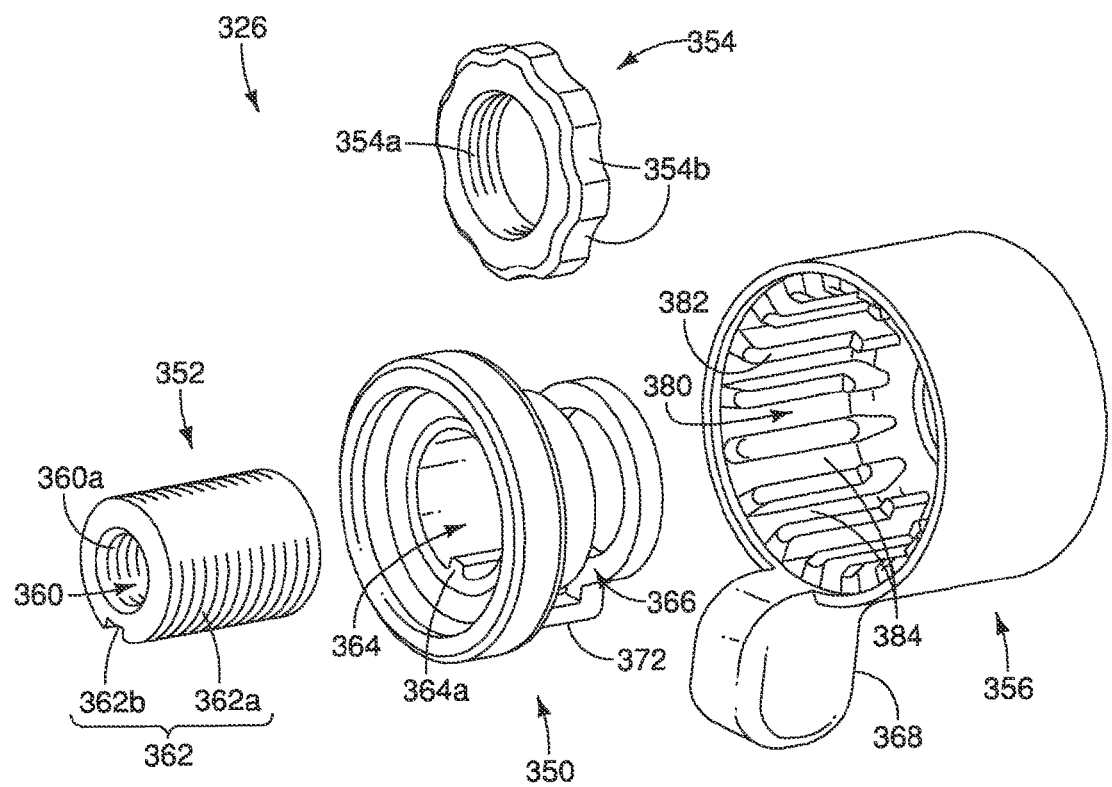
FIG. 22 is an exploded perspective view of the nut member in accordance with the third embodiment.
Figure 23:
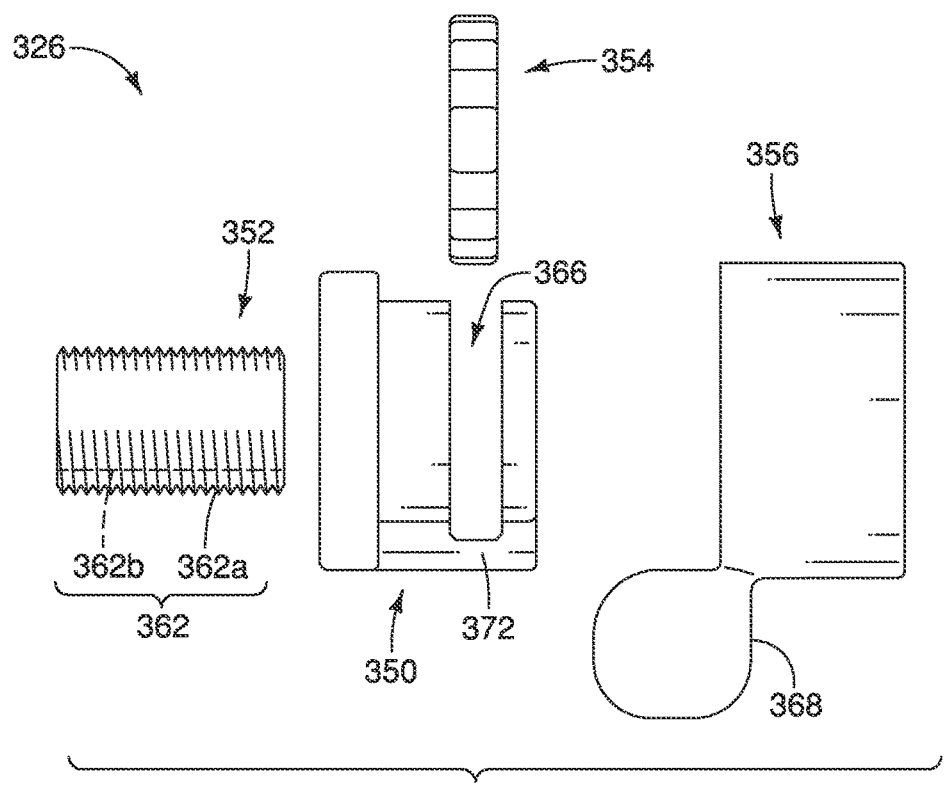
FIG. 23 is an exploded side elevational view of the nut member illustrated in FIG. 22 in accordance with the third embodiment.

As seen in FIGS. 16, 17 and 22, the cover member 356 is a cap that has a cavity 380 that is dimensioned to receive the main body member 350, the nut 352 and the adjustment member 354. In the engaged position, the cover member 356 is disposed on the main body member 350 such the adjustment member 354 is completely concealed by the cover member 356. In other words, the cover member 356 is configured to prevent the adjustment member 354 from being exposed while the cover member 356 is disposed on the main body member 350 in the engaged position. The cover member 356 also keeps the adjustment structure clean and free from dirt and mud.

Preferably, the cover member 356 includes an axial retention structure 382 that temporarily holds the main body member 350. In this third embodiment, the axial retention structure 382 is formed by a plurality of ribs or protrusions. The axial retention structure 382 (i.e., the ribs) mates with the outer diameter of the adjustment member 354 at the areas between the depressions 354 of the adjustment member 354 for releasably securing the cover member 356 to the main body member 350 by an interference fit connection. In other words, the axial retention structure 382 (i.e., the ribs) on the cover member 356 frictionally engage the outer diameter of the adjustment member 354 of the main body member 350 to holds the cover member 356 tightly to the main body member 350. Also the ribs of the axial retention structure 382 define a plurality of slots 384. The slots 384 constitute a second part of an angular adjustment structure between the main body member 350 and the cover member 356. In particular, the user can install the cover member 356 on the main body member 350 in a plurality of different angular positions by selectively engaging the restricting part 372 of the main body member 350 with the desired one of the slots 384. The slots 384 can be dimensioned relative to the restricting part 372 of the main body member 350 to form an interference fit connection therebetween to further frictionally secure the cover member 356 to the main body member 350 in a releasable manner.

Preferably, the ribs of the axial retention structure 382 also constitute a restricting part that is non-rotatably disposed on the main body member 350 with the cover member 356 in the engaged position. In particular, two of the ribs of the axial retention structure 382 (i.e., acting as the restricting part) engage opposite axially extending sides of the restricting part 372 of the main body member 350. Thus, restricting relative rotation between the main body member 350 and the cover member 356 by the restricting part 372 of the main body member 350 mating with two of the ribs of the axial retention structure 382 (i.e., acting as the restricting part) of the cover member 356.

Since the axial retention structure 382 restricts both rotation of the adjustment member 354 and the main body member 350, while the cover member 356 is disposed on the main body member 350, the nut 352 is effectively prevented from rotating and moving axially within the bore 364 of the main body member 350. In this way, the axial retention structure 382 also effectively restricts axial movement of the nut 352 respect to the main body member 350 while the cover member 356 is disposed on the main body member 350. In particular, the axial retention structure 382 of the cover member 356 frictionally engages the adjustment member 354 to prevent the adjustment member 354 from turning respect to the main body member 350, and thus, prevents axial movement of the nut 352 respect to the main body member 350. In other words, the inner diameter of the axial retention structure 382 of the cover member 356 is dimensioned such that there is slight interference with the outer diameter of the adjustment member 354 to restrict the adjustment member 354 from rotation once the cover member 356 snaps onto the main body member 350.

Figure 24:
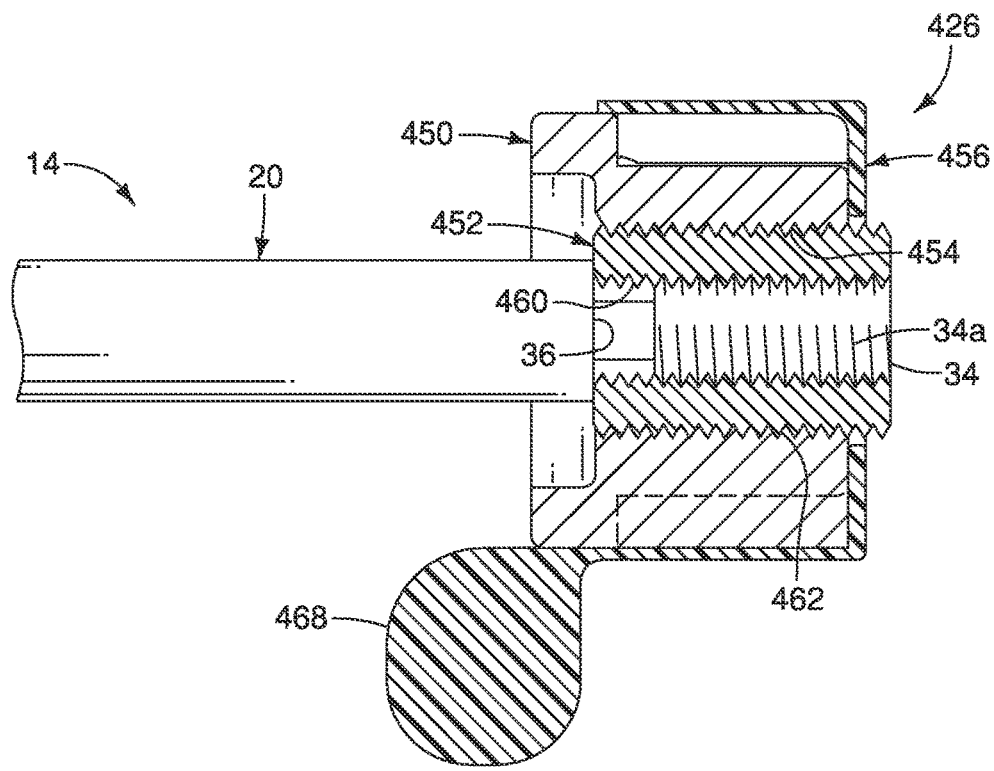
FIG. 24 is an enlarged cross-sectional view of a nut member in accordance with a fourth embodiment.

Referring now to FIG. 24, a nut member 426 is illustrated in accordance with another exemplary embodiment. Here, the nut member 426 includes a main body member 450, a nut 452 and a cover member 456. In other words, in this fourth embodiment of FIG. 24, the adjustment member 354 from the third embodiment has been eliminated by using the main body member 450, which basically integrates the main body member 350 and the adjustment member 352 of the third embodiment together as a single one-piece member. The nut member 426 is designed to replace the nut member 26 in the bicycle axle assembly 14, and thus the nut member 426 is threadedly screwed onto the second end 34 of the shaft member 20 in the same manner as the nut member 326 as discussed above.

Basically, the nut member 426 operates in the same way as the nut member 326, except the adjustment member 354 has been eliminated in this embodiment by the main body member 450 integrating the main body member 350 and the adjustment member 354 together as a single one-piece member. In particular, the main body member 450 has an internally threaded nut bore 454, while the nut 452 has an internal thread 460 and an external thread 462. The internally threaded nut bore 454 of the main body member 450 is screwed onto the external thread 462 of the nut 452 such that the main body member 450 and the nut 452 can be adjusted axially relative to each other. Thus, in this fourth embodiment, the adjustment structure includes the external thread 462 formed on the nut 452 and the internally threaded nut bore 454 formed on the main body member 450. Similar to the third embodiment, the main body member 450 also has a locking projection 468 for engaging the dropout 12a.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle axle assembly comprising:
   a nut including a bore having an internal thread,
   a main body member including an abutment surface configured to abut a dropout of a bicycle fork, the main body member further including a nut bore, the nut being disposed in a receiving end of the nut bore, the abutment surface being located at the receiving end of the nut bore; and
   an adjustment structure adjustably coupling the nut to move axially with respect to the main body member.

2. The bicycle axle assembly according to claim 1, wherein
   the adjustment structure includes an external thread formed on the nut and an internal thread formed on the nut bore of the main body member.

3. The bicycle axle assembly according to claim 1, wherein
   the adjustment structure includes an external thread formed on the nut and an internal thread formed on an adjustment member.

4. The bicycle axle assembly according to claim 3, wherein
   the nut further including a first anti-rotational structure;
   the main body member further including a second anti-rotational structure that is engaged with the first anti-rotational structure to restrict relative rotation between the nut and the main body member.

5. The bicycle axle assembly according to claim 3, wherein
   the adjustment member is threadedly engaged with the external thread of the nut such that rotation of the adjustment member relative to the main body member moves the nut axially with respect to the main body member.

6. The bicycle axle assembly according to claim 5, further comprising
   a shaft member having a first end and a second end with an external thread that is engaged with the internal thread of the nut;
   a head member movably disposed on the first end of the shaft member that is opposite to the second end of the shaft member; and
   a lever member operatively mounted on the head member to move the head member relative to the shaft member in response to movement of the lever member.

7. The bicycle axle assembly according to claim 6, wherein
   the shaft member has a stopper that is formed adjacent an axially inner end of the external thread of the shaft member and that contacts the nut to prevent the external thread of the shaft member from further being screwed into the nut.

8. The bicycle axle assembly according to claim 3, wherein the main body member includes a slot rotatably receiving the adjustment member.

9. The bicycle axle assembly according to claim 8, wherein
the slot is dimensioned to restrict axial movement of the adjustment member relative to the main body member.

10. The bicycle axle assembly according to claim 3, further comprising
a restricting part configured to be non-rotatably disposed on the main body member in an engaged position and configured to restrict rotation of the adjustment member while the restricting part is disposed on the main body member in the engaged position.

11. The bicycle axle assembly according to claim 10, wherein
the restricting part includes an axial retention structure that temporarily holds the main body member.

12. The bicycle axle assembly according to claim 11, wherein
the axial retention structure releasably secures the restricting part to the main body member by a snap fit connection.

13. The bicycle axle assembly according to claim 11, wherein
the axial retention structure releasably secures the restricting part to the main body by an interference fit connection.

14. The bicycle axle assembly according to claim 3, further comprising
a cover member configured to be disposed on the main body member in an engaged position and configured to prevent the adjustment member from being exposed while the cover member is disposed on the main body member in the engaged position.

15. The bicycle axle assembly according to claim 14, wherein
the cover member includes an axial retention structure that temporarily holds the main body member.

16. The bicycle axle assembly according to claim 15, wherein
the axial retention structure releasably secures the cover member to the main body member by a snap fit connection.

17. The bicycle axle assembly according to claim 15, wherein
the axial retention structure releasably secures the cover member to the main body member by an interference fit connection.

18. The bicycle axle assembly according to claim 1, further comprising
a shaft member having a first end and a second end with an external thread that is engaged with the internal thread of the nut;
a head member movably disposed on the first end of the shaft member that is opposite to the second end of the shaft member; and
a lever member operatively mounted on the head member to move the head member relative to the shaft member in response to movement of the lever member.

19. The bicycle axle assembly according to claim 18, wherein
the shaft member has a stopper that is formed adjacent an axially inner end of the external thread of the shaft member and that contacts the nut to prevent the external thread of the shaft member from further being screwed into the nut.

20. The bicycle axle assembly according to claim 1, wherein
the main body member further includes a projection that is arranged to engage the dropout of the bicycle frame.

21. The bicycle axle assembly according to claim 1, further comprising
a restricting part configured to be non-rotatably disposed on the main body member in an engaged position and configured to restrict axial movement of the nut respect to the main body member while the restricting part is disposed on the main body member in the engaged position.

22. The bicycle axle assembly according to claim 21, wherein
the restricting part includes an axial retention structure that temporarily holds the main body member.

23. The bicycle axle assembly according to claim 22, wherein
the axial retention structure releasably secures the restricting part to the main body member by a snap fit connection.

24. The bicycle axle assembly according to claim 22, wherein
the axial retention structure releasably secures the restricting part to the main body member by an interference fit connection.

25. The bicycle axle assembly according to claim 1, further comprising
a cover member configured to be disposed on the main body member in an engaged position and configured to prevent the adjustment structure from being exposed while the cover member is disposed on the main body member in the engaged position.

26. A bicycle axle assembly comprising:
a nut including a bore having an internal thread;
a main body member including a nut bore, the nut being disposed in the nut bore;
an adjustment structure adjustably coupling the nut to move axially with respect to the main body member; and
a cover member configured to be disposed on the main body member in an engaged position and configured to prevent the adjustment structure from being exposed while the cover member is disposed on the main body member in the engaged position, the cover member including an axial retention structure that temporarily holds the main body member.

27. The bicycle axle assembly according to claim 26, wherein
the axial retention structure releasably secures the cover member to the main body member by a snap fit connection.

28. The bicycle axle assembly according to claim 26, wherein
the axial retention structure releasably secures the cover member to the main body member by an interference fit connection.

29. A bicycle axle assembly comprising:
a nut including an external surface having an external thread, a bore having an internal thread and a first anti-rotational structure;
a shaft member having a first end and a second end with an external thread that is engaged with the internal thread of the nut, the shaft member having a stopper that is formed adjacent an axially inner end of the external thread of the shaft member and that contacts the nut to prevent the external thread of the shaft member from further being screwed into the nut;

a main body member including a nut bore, the nut being disposed in the nut bore, and a second anti-rotational structure that is engaged with the first anti-rotational structure to restrict relative rotation between the nut and the main body member; and an adjustment member rotatably disposed in a slot of the main body member and threadedly engaged with the external thread of the nut such that rotation of the adjustment member relative to the main body member moves the nut axially with respect to the main body member.

\* \* \* \* \*